Nov. 22, 1932.    M. WAGNER    1,888,897
UNDERFRAME FOR AUTOMOBILE VEHICLES
Filed June 18, 1931
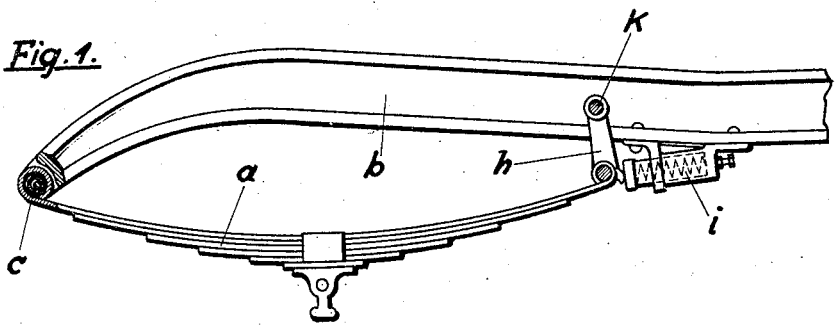
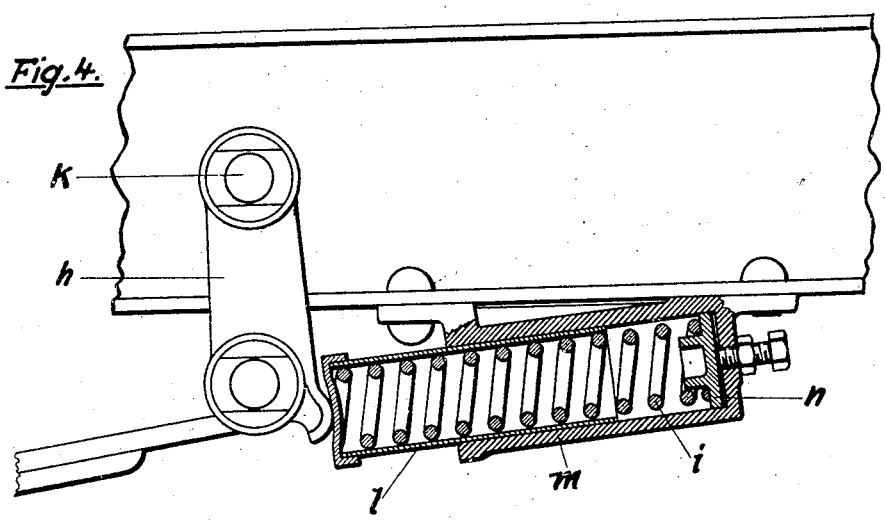
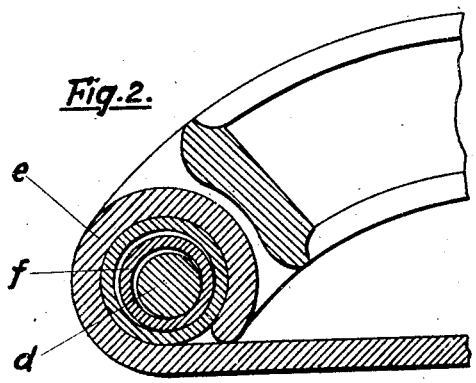
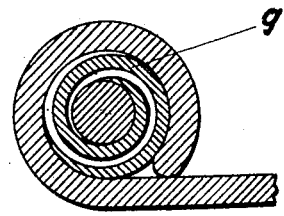
Inventor
Max Wagner
By Marks & Clerk
Attys.

Patented Nov. 22, 1932

1,888,897

UNITED STATES PATENT OFFICE

MAX WAGNER, OF STUTTGART, GERMANY, ASSIGNOR TO DAIMLER-BENZ AKTIENGE-SELLSCHAFT, OF STUTTGART-UNTERTURKHEIM, GERMANY, A COMPANY OF GERMANY

UNDERFRAME FOR AUTOMOBILE VEHICLES

Application filed June 18, 1931, Serial No. 545,292, and in Germany January 25, 1930.

This invention relates to means for eliminating what is generally called the shimmy of front wheels of automobile vehicles, which sometimes arises when travelling fast over not absolutely smooth ground, and more particularly to that method of connecting the supporting springs of the front axle with the underframe, by which the one end of the spring is yieldingly connected to the vehicle frame by means of loose bushes being radially movable or of one or more spiral springs.

My invention resides in this that the other end of said supporting spring is pivotally connected to the vehicle frame by means of an interposed shackle and is supported by a spring that will counteract any displacement of the shackle opposed to the travelling direction.

As compared with the arrangements heretofore proposed the present invention is advantageously distinguished by the fact that the simplest means are provided and the springs may be located closely underneath the frame, which results in facilitating the mounting of the front axle.

When traveling, any shocks that are exerted upon the wheels will displace the axle in a direction contrary to that of travelling. Such displacement is counteracted by the linking mechanism of the forward spring end as well as by the spring bearing upon the joint provided on the rear end. As a result of this arrangement the axle is always thrust back into its original position and wabbling of the front wheels—most inconvenient phenomenon—is eliminated.

A constructional example of the invention is diagrammatically illustrated in the accompanying drawing, in which Figure 1 shows in side elevation a front axle of a vehicle, Figures 2 and 3 show on a larger scale two different embodiments of the forward linking mechanism, Figure 4 shows on a larger scale the backward connection with the frame.

The spring $a$ is connected, on its forward end, to the vehicle frame $b$ by means of the linking mechanism $c$ and one or more bushes $f$ are loosely inserted between the pivot $d$ and the spring eye $e$, the clearance space being filled with any lubricant. As is illustrated by Fig. 3, spiral spring $q$ may be substituted for said bushes. The rear end of the spring $a$ is connected to the vehicle frame by means of a shackle $h$ and the pivot $k$. On the shackle $h$ is supported the spring $i$ which is inserted in a tube $l$ sliding within a casing secured to the vehicle frame, a bearing $n$ that is adjustable from without by means of a screw being provided to permit adjustment of said spring.

What I claim is:

1. In an automobile vehicle, the combination with the vehicle frame and an axle for the steering wheels, of a longitudinal supporting spring for connecting the axle to the vehicle, means for connecting the front end of said spring to the vehicle frame comprising an eye on one of said elements, viz frame or spring and a pivot on the other element, said pivot fitting the eye loosely, a shackle pivotally connected to the rear end of the spring and to the vehicle frame and a spring connected to the rear end of the spring and to the vehicle frame and arranged so as to urge the axle supporting spring forwardly.

2. In an automobile vehicle, the combination with the vehicle frame and an axle for the steering wheels, of a longitudinal supporting spring for connecting the axle to the vehicle, an eye on the front end of said spring, a pivot on the frame for said eye, said pivot fitting the eye loosely, a bush interposed between said eye and pivot and capable of radial movement with respect thereto, a shackle pivotally connected to the rear end of the spring and to the vehicle frame and a spring connected to the rear end of the spring and to the vehicle frame and arranged so as to urge the axle supporting spring forwardly.

3. In an automobile vehicle, the combination with the vehicle frame and an axle for the steering wheel, of a longitudinal supporting spring for connecting the axle to the vehicle, an eye on the front end of said spring, a pivot on the frame for said eye, said pivot fitting the eye loosely, a shackle pivotally connected to the rear end of the spring and to the vehicle frame, a casing fixed on the frame in proximity to the rear end of the spring and having a tubular member slidable longitudinally therein and with its front end bearing against the rear end of the axle supporting spring and a helical spring inside said tubular member and casing for urging the rear end of the axle supporting spring forwardly.

4. In an automobile vehicle, the combination with the vehicle frame and an axle for the steering wheels, of a longitudinal supporting spring for connecting the axle to the vehicle, an eye on the front end of said spring, a pivot on the frame for said eye, said pivot fitting the eye loosely, a spiral spring interposed between said eye and pivot, a shackle pivotally connected to the rear end of the spring and to the vehicle frame and a spring connected to the rear end of the spring and to the vehicle frame and arranged so as to urge the axle supporting spring forwardly.

5. In an automobile vehicle, the combination as set forth in claim 3 with a movable bearing inside the casing for the end of the helical spring remote from the rear end of the axle supporting spring and adjusting means for said bearing passed through the casing for adjusting the helical spring.

In testimony whereof I affix my signature.

MAX WAGNER.